United States Patent [19]

Matsuda et al.

[11] 3,997,490
[45] Dec. 14, 1976

[54] AQUEOUS DISPERSIONS OF AMPHOTERIC POLYURETHANE-UREA AND METHOD OF MAKING

[75] Inventors: Kazuo Matsuda; Hidemasa Ohmura; Hirakazu Aritaki, all of Wakayama, Japan

[73] Assignee: Kao Soap Co., Ltd., Tokyo, Japan

[22] Filed: Feb. 3, 1975

[21] Appl. No.: 546,731

[30] Foreign Application Priority Data

Feb. 15, 1974 Japan .............................. 49-18221

[52] U.S. Cl. ................ 260/29.2 TN; 260/29.6 NR; 260/75 NM; 260/75 NA; 260/77.5 AQ; 260/859 R
[51] Int. Cl.$^2$ ..................... C08J 3/06; C08L 75/12
[58] Field of Search ............... 260/77.5 Q, 29.2 TN

[56] References Cited

UNITED STATES PATENTS

| | | | |
|---|---|---|---|
| 3,294,752 | 12/1966 | Wilkinson | 260/77.5 Q |
| 3,372,085 | 3/1968 | Westfall et al. | 260/77.5 Q |
| 3,384,606 | 5/1968 | Dieterich et al. | 260/29.2 TN |
| 3,388,087 | 6/1968 | Dieterich et al. | 260/29.2 TN |
| 3,419,533 | 12/1968 | Dieterich | 260/29.2 TN |
| 3,461,103 | 8/1969 | Keberle et al. | 260/75 |
| 3,491,050 | 1/1970 | Keberle et al. | 260/77.5 Q |
| 3,836,493 | 9/1974 | Matsuda et al. | 260/29.2 TN |
| 3,892,696 | 7/1975 | Wood | 260/29.2 TN |
| 3,903,031 | 9/1975 | Matsuda et al. | 260/29.2 TN |
| 3,903,032 | 9/1975 | Matsuda et al. | 260/29.2 TN |

Primary Examiner—Murray Tillman
Assistant Examiner—A. H. Koeckert
Attorney, Agent, or Firm—Woodhams, Blanchard and Flynn

[57] ABSTRACT

A process for the preparation of thermosetting resin emulsions, which comprises (1) reacting an isocyanate-terminated urethane prepolymer with an excess of a polyalkylene-polyamine to form a polyurethane-urea-polyamine, (2) reacting the thus-formed polyurethane-urea-polyamine with an epihalohydrin, (3) rendering the resulting reaction product amphoteric by reacting said reaction product with (a) a compound selected from the group consisting of 1,3-propane sultone, 1,4-butane sultone, β-propiolactone, ε-caprolactone, δ-valerolactone and sodium monohalogenocarboxylates having the formula $X(CH_2)_nCOONa$, in which X is halogen and $n$ is an integer of 1 to 2, in an amount sufficient to emulsify the final polymer, or by reacting said reaction product (b) with a compound selected from the group consisting of methyl acrylate, ethyl acrylate, methyl methacrylate, ethyl methylacrylate and acrylonitrile, in an amount sufficient to emulsify the final polymer and hydrolyzing the resulting product, and (4) mixing the thus-formed polymer with water.

5 Claims, No Drawings

AQUEOUS DISPERSIONS OF AMPHOTERIC POLYURETHANE-UREA AND METHOD OF MAKING

BACKGROUND OF THE INVENTION

1. Field of the Invention

This invention relates to a process for the preparation of thermosetting resin emulsions. More particularly, this invention relates to a process for the preparation of a homogeneous and stable self-emulsifiable emulsion of an amphoteric polyurethane.

2. Description of the Prior Art

As conventional methods for preparing polyurethane emulsions, there are known a method comprising emulsifying and suspending a polyurethane composition in water in the presence of an emulsifier, and a method for preparing an emulsifier-free polyurethane emulsion by forming a composition of a polyurethane containing a tertiary amino group by using an active hydrogen compound containing a tertiary amino group, and quaternizing said amino group or mixing said polyurethane composition with an aqueous solution of an acid, and the like.

It is also known that a self-emulsifiable polyurethane emulsion can be obtained by reacting a composition of a polyurethane containing free primary and/or secondary hydroxyl groups and/or amino groups with a salt or a 3- to 7-membered cyclic compound containing a group capable of forming a salt on ring-opening.

Conventional methods using an emulsifier are disadvantageous because a large quantity of an emulsifier is generally employed, so that the resulting emulsion is expensive. Also, because the emulsifier destroys the emulsion on application or has bad influences on the properties of the product obtained after drying, the fields of use of emulsions prepared by these methods are extremely limited.

In the prior art methods comprising converting the tertiary amino group contained in a polyurethane composition to an acid salt or quaternizing such tertiary amino group, or the prior art methods comprising reacting free hydroxyl and/or amino groups in a polyurethane composition with a salt or 3- or 7-membered cyclic compound containing a group capable of forming a salt on ring-opening, when the molecular weight of the polyurethane is increased to such an extent that good mechanical properties can be obtained, the stability of the polyurethane emulsion is lowered and the emulsion frequently becomes heterogeneous. In contrast, in these conventional methods, when the molecular weight of the polyurethane is decreased so as to obtain a stable emulsion, the tensile strength and elongation of the resulting polyurethane resin are drastically lowered. Thus, in these conventional methods, there is inevitably observed the disadvantage that the stability of the emulsion and the mechanical properties of the resulting polyurethane resin are contradictory to each other, that is, one cannot be increased without simultaneously decreasing the other, and vice versa.

We previously invented a cationic polyurethane emulsion of the self-crosslinking type (Japanese Laid Open Pat. application No. 33141/72) as an emulsion overcoming the foregoing disadvantages involved in the conventional techniques. In general, polymer latices are used in the state of admixture with other latices, fillers, modifiers and other additives, and in order to attain good stability and compatibility in the resulting mixed latices, polymer latices differing in their ionic characteristics are chosen and mixed.

Accordingly, the development of cationic, anionic, amphoteric and nonionic polyurethane emulsions of both the self-emulsifiable type and the self-crosslinking type is of great industrial significance.

As an effective method for imparting a self-crosslinking property to a polyurethane resin, there can be mentioned a method comprising using as a chain extender for urethane prepolymers a polyalkylene-polyamine (I) having as functional groups at least two primary or secondary amino groups and a group $-CH_2-CH(OH)-CH_2X'$, in which $X'$ is $Cl$ or $Br$, which is prepared by adding an epihalohydrin to a polyalkylene-polyamine. However, the compound (I) is readily changed with the passage of time depending on its structure, and the reaction conditions must be strictly controlled in the reaction of adding the epihalohydrin to the polyalkylene-polyamine or the reaction of chain-extending the urethane prepolymer by the compound (I). Accordingly, when urethane prepolymers having specific structural features are used, it is difficult to produce a polyurethane emulsion in a large quantity with good reproducibility. In some cases, such disadvantages as reduced stability of the polyurethane emulsion obtained according to this method or of a latex formed by mixing such polyurethane emulsion with other polymer latices is brought about.

SUMMARY OF THE INVENTION

We have discovered that a stable, amphoteric, self-emulsifiable, self-crosslinking emulsion containing a polyurethane resin possessing excellent tensile strength, elongation and other mechanical properties, is obtained by (1) reacting (A) an isocyanate-terminated urethane prepolymer formed from a polyhydroxyl compound and an excess of a polyisocyanate, with (B) an excess of a polyalkylene-polyamine to form a polyurethane-urea-polyamine, then (2) reacting the thus-formed polyurethane-urea-polyamine with an epihalohydrin, (3) transforming the resulting reaction product to an amphoteric state by reacting said reaction product with either (a) a compound selected from the group consisting of 1,3-propane sultone, 1,4-butane sultone, $\beta$-propiolactone, $\epsilon$-caprolactone, $\delta$-valerolactone and sodium monohalogenocarboxylates having the formula $X(CH_2)_n COONa$, wherein $X$ is halogen and n is an integer of 1 or 2, in an amount sufficient to emulsify the final polymer, or (b) by reacting said reaction product with a compound selected from the group consisting of methyl acrylate, ethyl acrylate, methyl methacrylate, ethyl methacrylate and acrylonitrile in an amount sufficient to emulsify the final polymer and hydrolyzing the resulting product, and (4) mixing the thus-formed polymer with water.

The polyurethane resin obtained by drying the polyurethane emulsion obtained according to the process of this invention undergoes a thermosetting reaction when it is heat-treated, thereby to form cross-linkages in the polyurethane resin, resulting in improvements of its physical properties such as those mentioned above. Accordingly, in the polyurethane emulsion of this invention, it is unnecessary to increase excessively the molecular weight of the polymer in the emulsion in order to improve such physical properties, and hence, a very good emulsion stability can be attained simultaneously with good physical properties in the polyurethane emulsion of this invention.

According to this invention, therefore, a stable emulsion containing a polyurethane resin having excellent physical properties can readily be obtained.

The polyurethane-urea-polyamine used for the preparation of the composition of this invention is obtained by reacting an (A) isocyanate-terminated urethane prepolymer formed from a polyhydroxyl compound and an excess of a polyfunctional isocyanate, with (B) a polyalkylene-polyamine, preferably in a solvent of the ketone type, such as acetone or methyl ethyl ketone.

As the polyfunctional isocyanate, there can be used aromatic, alicyclic and aliphatic diisocyanates such as, for example, 1,5-naphthylene diisocyanate, 4,4'-diphenylmethane diisocyanate, 4,4'-diphenyldimethylmethane diisocyanate, di- and tetra-alkyldiphenylmethane diisocyanates, 4,4'-dibenzyl isocyanate, 1,3-phenylene diisocyanate, 1,4-phenylene diisocyanate, tolylene diisocyanates, chlorinated isocyanates, phosphorus-containing isocyanates, butane-1,4-diisocyanate, hexane-1,6-diisocyanate, dicyclohexylmethane diisocyanate, cyclohexane-1,4-diisocyanate, xylylene diisocyanate and lysine diisocyanate. In addition, triisocyanates such as 1-methylbenzole-2,4,6-triisocyanate, biphenyl-2,4,4'-triisocyanate and triphenylmethane triisocyanate can be used in combination with the foregoing diisocyanates.

The polyhydroxyl compounds used for the preparation of the urethane prepolymer in this invention includes those having a molecular weight of from 200 to 10,000. Any of the known polyhydroxyl compounds customarily used for the preparation of polyurethanes, such as polyethers, polyesters, polyester amides, polyacetals, polythioethers and polybutadiene glycols can be used in this invention.

As the polyethers that can be used as the polyhydroxyl compound, there can be mentioned, for example, homopolymers and graft copolymers of tetrahydrofuran, ethylene oxide, propylene oxide, butylene oxide and the like.

It is also possible to use homogeneous or mixed polyethers formed by condensation of hexane diol, methylhexane diol, heptane diol and octane diol. Still further, glycols such as bisphenol A and adducts formed by adding ethylene oxide, propylene oxide or the like to bisphenol A can be used. In addition, propoxylated and ethoxylated glycols can be used.

As the polythioethers that can be used as the polyhydroxyl compound, condensation products of thioglycols alone or together with other glycols are preferred.

As the polyacetal, there can be mentioned, for example, water-insoluble polyacetals prepared from hexane diol and formaldehyde or from 4,4'-dihydroxyethoxydiphenyldimethylmethane and formaldehyde.

As typical examples of the polyester, there can be mentioned polyester glycols formed by dehydrating condensation of saturated or unsaturated low molecular weight glycols such as ethylene glycol, propylene glycol, 1,3-butane diol, 1,4-butane diol, neopentyl glycol, pentane diol, hexane diol, octane diol, 2-ethyl-1,3-hexane diol, 1,4-butyne diol, bisphenol A, diethylene glycol, triethylene glycol and dipropylene glycol, with dibasic acids, and polyester glycols obtained by ring-opening polymerization of cyclic ester compounds.

If necessary, glycols customarily used in this field such as ethylene glycol, diethylene glycol, triethylene glycol, butane diol, propane diol, 1,6-hexane diol, neopentyl glycol and N-alkyldiethanolamines containing an alkyl group having 1 to 22 carbon atoms, can be used in combination with the above-mentioned polyhydroxyl compounds.

The preparation of the isocyanate-terminated urethane prepolymer used in this invention is performed in the presence or absence of a solvent. When an aromatic polyisocyanate is used for reaction with the polyhydroxyl compound, a reaction temperature of 50° to 100° C. is employed, and when an aliphatic or alicyclic polyisocyanate is used, a reaction temperature of 70° to 130° C. is employed.

In the preparation of the isocyanate-terminated urethane prepolymer, it is preferred that the amount of the polyisocyanate is selected so that all of the hydroxyl groups are reacted completely with the isocyanate groups.

More specifically, it is preferred that the ratio of the total number of the isocyanate groups to the total number of reactive hydrogen atoms (—OH groups) be within the range of from 1.1 : 1.0 to 5.0 : 1.0.

As the polyalkylene-polyamine used in this invention, there can be mentioned, for example, polyalkylene polyamines such as polyethylene polyamine, polypropylene polyamine and polybutylene polyamine.

More specifically, the polyalkylene-polyamines used in this invention include those in which the nitrogen atoms are connected via —$(CH_2)_n$— groups where n is an integer larger than 1, and usually from 2 to about 4 of such —$(CH_2)_n$— groups are present in the molecule.

In such polyalkylene-polyamines, the nitrogen atoms can be bonded to adjacent carbon atoms of the —$(CH_2)_n$— group, but two nitrogen atoms are not bonded to the same carbon atom.

The polyalkylene-polyamines have the formula

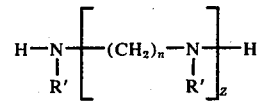

wherein $n$ is as defined above, Z is an integer from 2 to 4, and R', which can be the same or different, are hydrogen, alkyl having 1 to 4 carbon atoms or hydroxyalkyl having 1 to 4 carbon atoms.

Specific examples of the polyalkylene-polyamines include diethylene triamine, triethylene tetramine, tetraethylene pentamine, dipropylene triamine, mixtures thereof and various purified polyamine materials. Further, hydroxyalkyl-substituted polyamines can be used in this invention.

In some cases, in order to change the density of the hydrophilic groups in the polyurethane emulsion obtained according to this invention or to improve the properties of the polyurethane resin, it is preferred to change or increase the distance between the amino groups in the polyurethane-urea-polyamine molecule. This can be accomplished by replacing a part of the polyalkylene-polyamine used by ethylene diamine, propylene diamine, hexamethylene diamine, piperazine phenylene diamine, an alkyl (having 1 to 22 carbon atoms) substitution product of such diamine, an alkylene oxide adduct of such diamine, an acrylonitrile adduct of such diamine, an acrylic acid ester adduct of such diamine or the like.

For attaining this object, it is generally preferred that up to about 50 molar percent of the polyalkylene-polyamine be replaced by the diamine.

It is preferred that the reaction between the isocyanate-terminated urethane prepolymer and the polyalkylene polyamine be carried out at a reaction temperature of −20 to +70° C., under atmospheric pressure, in a solvent of the ketone type.

As the ketone type solvent, there can be mentioned acetone, methylethyl ketone, diethyl ketone, dipropyl ketone, methylisobutyl ketone and the like. Use of acetone and methylethyl ketone is especially preferred.

A solvent mixture of such ketone type solvent with benzene, tetrahydrofuran, dioxane, ethyl acetate, dimethylformamide or a chlorinated hydrocarbon type solvent can also be used.

The reaction time is determined depending on the reaction temperature and the reactivity of the polyisocyanate compound, and a shorter or longer reaction time is adopted under various reaction conditions. The termination of the reaction is confirmed by the fact that no absorption owing to the isocyanate group is observed at 2250 cm$^{-1}$ in the infrared absorption spectrum of the reaction mixture. In general, the reaction is completed in 0.5 to 2 hours.

In the reaction between the urethane prepolymer and polyalkylene-polyamine, it is critical that the total number of the primary and secondary amino groups should be in excess in relation to the total number of the isocyanate groups in the urethane prepolymer. As the total mole number of the amino groups becomes close to the total mole number of the isocyanate groups, a polyurethane-urea-polyamine of a high molecular weight is formed, and a gelled product or a product having a great tendency to become gelated is formed. When the ratio of the total mole number of the amino groups to isocyanate groups is too high, the molecular weight of the polyurethane-urea-polyamine is so low that a resin having excellent physical properties cannot be prepared when a polyurethane emulsion is formed by using such low-molecular-weight polyurethane-urea-polyamine as the intermediate.

In view of the foregoing, it is preferred that the ratio of the total number (B) of moles of the primary and secondary amino groups in the polyalkylene-polyamine, to the total number (A) of moles of the isocyanate groups in the isocyanate-terminated urethane prepolymer, be within the range of $1 < B/A \leqq 5$, especially $1 < B/A \leqq 3$. It is also preferred that the molecular weight of the polyurethane-urea-polyamine be within the range of from 5,000 to 100,000.

In order to impart a self-crosslinking property to the urethane resin in an amphoteric polyurethane emulsion prepared by using, as the intermediate, the thus-formed polyurethane-urea-polyamine, this polyurethane-urea-polyamine is reacted with an epihalohydrin in an amount of 0.2 to 1.0 mole of said epihalohydrin per mole of the primary and secondary amino groups of the polyurethane-urea-polyamine. It is preferred to use epichlorohydrin or epibromohydrin as the epihalohydrin. The conditions for this reaction vary depending on the kind of the polyurethane-urea-polyamine employed, but, in general, the reaction is carried out at a temperature of 20° to 70° C. for 0.5 to 5 hours. The crosslinkage density can be varied by varying the mixing weight ratio of the epihalohydrin.

The thus-obtained reaction product is then rendered amphoteric by reacting the amino groups of the reaction product at a temperature of 40° to 70° C. for 3 to 7 hours with an amphoteric agent in an amount sufficient to emulsify the final polymer, and the resulting amphoteric product is mixed with water to obtain an amphoteric polyurethane emulsion.

The termination of this reaction is determined based on the emulsion state observed when the reaction mixture is mixed with water and the mixture is shaken.

The organic solvent used for the reaction can be distilled off from the thus-prepared amphoteric polyurethane emulsion, preferably under reduced pressure. Even if the organic solvent is distilled off, the stability of the emulsion is not degraded at all.

As the preferred amphoteric agents in this invention, there can be mentioned compounds selected from the group consisting of 1,3-propane sultone, 1,4-butane sultone, β-propiolactone, ε-caprolactone, δ-valerolactone and sodium monohalogenocarboxylates having the formula X(CH$_2$)$_n$COONa, in which X is halogen and n is an integer of 1 or 2. Still further, the reaction product of the polyurethane-urea-polyamine with the epihalohydrin can be rendered amphoteric by reacting it with a compound selected from the group consisting of methyl acrylate, ethyl acrylate, methyl methacrylate, ethyl methacrylate and acrylonitrile and then hydrolyzing the resulting reaction product. In the hydrolysis step, the ester groups are hydrolyzed by adding an aqueous solution of an alkali and conducting hydrolysis at a temperature of from 40° to 70° C., for from 2 to 5 hours.

As specific examples of the sodium monochloroacetate, sodium monobromoacetate, sodium monobromopropionate, sodium moniiodoacetate, sodium monoiodopropionate, sodium monofluoroacetate and sodium monofluoropropionate. From the industrial and economical viewpoints, use of sodium monochloroacetate is especially preferred.

In general, the amphoteric agent is used for reaction with the primary and secondary amino groups of the reaction product of the polyurethane-urea-polyamine with the epihalohydrin in an amount sufficient to emulsify the final polymer. In general, it is preferred that the amphoteric agent be used in an amount of 0.5 to 2.0 moles per mole of such amino groups.

The thus-prepared self-emulsifiable and self-crosslinking emulsion containing generally 5 to 50 weight percent of the polyurethane resin can be applied to fibrous materials, nonwoven fabrics, papers, leather, rubbers, woods, metals, concrete, gypsum, glass, glass fibers and plastics by the immersion treatment or by coating or spraying treatments followed by drying, whereby there are attained the effects of improved touch and improved bondability and surface coating of these materials. Further, the emulsion of this invention can be used for production of construction materials and as adhesives and the like.

The polyurethane emulsion prepared according to the process of this invention is a so-called self-emulsifiable emulsion free of an emulsifier. However, in order further to improve the emulsion stability of the product, it is possible to add a known emulsifier provided that the properties of the polyurethane resin are not drastically changed thereby.

This invention will now be described in more detail by reference to the following illustrative Examples.

EXAMPLE 1

410 Parts of benzene was added to 1020 parts of dehydrated polytetramethylene ether glycol (having a hydroxyl value of 110), and 348 parts of an 80 : 20 mixture of 2,4-tolylene diisocyanate and 2,6-tolylene diisocyanate was further added thereto. The reaction was carried out at 80° C. for 1 hour to obtain a urethane prepolymer having a terminal isocyanate group content of 4.73 percent.

Another flask was charged with 2500 parts of methylethyl ketone and 68 parts of diethylene triamine, and while the temperature of the charge of the flask was maintained below 10° C. by external cooling, 1000 parts of the above prepolymer solution was gradually added dropwise to the charge in the flask under agitation over a period of 2 hours to obtain a polyurethane-urea-polyamine solution.

6.1 Parts of epichlorohydrin was added to 357 parts of the thus-formed polyurethane-urea-polyamine solution, and the reaction was carried out at 50° C. for 2 hours. Then, 12.6 parts of 1,3-propane sultone was added to the reaction mixture, and the mixture was heated and agitated at 50° C. for 2 hours to render the amino groups in the polyurethane-urea-polyamine amphoteric.

Then, 250 parts of water was added to the reaction mixture, and benzene and methylethyl ketone were distilled off from the mixture under reduced pressure while maintaining the bath temperature at 60° C. Then, the concentration was adjusted by the addition of water to obtain a low viscosity, stable emulsion having a resin content of 25 percent.

When this emulsion was air-dried, a homogeneous transparent rubbery film was obtained. When the film was heat-treated at 120° C. for 20 minutes, the physical properties were improved. The mechanical properties of the film were as shown below:

|  | Air-Dried Product | Heat-Treated Product |
| --- | --- | --- |
| Tensile strength (Kg/cm$^2$) | 81 | 194 |
| 300 % Modulus (Kg/cm$^2$) | 32.4 | 35.7 |
| Elongation (%) | 920 | 850 |

Comparative Example 1

357 Parts of the polyurethane-urea-polyamine prepared in Example 1 was not reacted with epichlorohydrin, but rather was reacted directly with 12.6 parts of 1,3-propane sultone at 50° C. for 2 hours to render the amino groups in the polyurethane-urea-polyamine amphoteric.

In the same manner as in Example 1, water was added to the reaction mixture and the organic solvents used were distilled off to obtain an emulsion having a resin content of 25 percent.

A heat-treated film product prepared from this emulsion in the same manner as in Example 1 had the mechanical properties as shown below:
Tensile strength : 118 Kg/cm$^2$
300 % Modulus : 15.4 Kg/cm$^2$
Elongation : 950 %

When the results of Example 1 (the process of this invention) are compared with the results of Comparative Example 1, it will readily be understood that a film formed from a polyurethane emulsion prepared according to the process of this invention has excellent mechanical properties.

EXAMPLE 2

The procedures of Example 1 were repeated in the same manner except that 7.4 parts of β-propiolactone was used instead of 1,3-propane sultone, to obtain a low viscosity, homogeneous and stable emulsion having a resin content of 25 percent.

A heat-treated film product prepared from this emulsion in the same manner as in Example 1 had the mechanical properties as shown below:
Tensile strength : 214 Kg/cm$^2$
300 % Modulus : 42.2 Kg/cm$^2$
Elongation : 840 %

When this heat-treated film having a thickness of about 1 mm was immersed in trichloroethylene maintained at 25° C. for 1 hour, about 10 percent weight increase was observed.

Comparative Example 2

The procedures of Comparative Example 1 were repeated in the same manner except that 7.4 parts of β-propiolactone was used instead of 1,3-propane sultone, to obtain an emulsion having a resin content of 25 percent.

A heat-treated film product prepared from this emulsion in the same manner as in Example 1 had the mechanical properties as shown below:
Tensile strength : 110 Kg/cm$^2$
300 % Modulus : 14.5 Kg/cm$^2$
Elongation : 980 %

When this heat-treated film having a thickness of about 1 mm was immersed in trichloroethylene in the same manner as in Example 2, a weight increase exceeding 100 percent was observed (the weight of the film after the immersion treatment was more than 2 times the weight of the film before the immersion treatment).

When the results of Example 2 (the process of this invention) are compared with the results of Comparative Example 2, it will readily be understood that a polyurethane resin contained in a polyurethane emulsion prepared according to the process of this invention has excellent mechanical and chemical properties.

EXAMPLE 3

90 Parts of benzene and 34.8 parts of an 80 : 20 mixture of 2,4-tolylene diisocyanate and 2,6-tolylene diisocyanate were added to 202 parts of polyoxypropylene glycol (having a hydroxyl value of 55.1), which had been dehydrated at 90° C. and 20 mm Hg for 3 hours, and the reaction was carried out under agitation at 80° C. for 5 hours to obtain a solution of a urethane prepolymer having a terminal isocyanate group content of 2.50 percent.

Another flask equipped with an agitator and a thermometer was charged with 3.82 parts of diethylene triamine and 250 parts of methylethyl ketone, and while the temperature of the charge of the flask was maintained at 10° C. by external ice cooling, 100 parts of the above prepolymer solution was gradually added dropwise to the charge in the flask under agitation over a period of 1 hour. The reaction was then conducted at 50° C. for 30 minutes to form a polyurethane-urea-polyamine solution. Then, 5.6 parts of epichlorohydrin was added to the thus-formed polyurethane-urea-polyamine solution, and the reaction was conducted at 50° C. for 1.5 hours.

Subsequently, 5.2 parts of methyl acrylate was added to the reaction mixture, and the mixture was heated and agitated at 70° C. for 5 hours. Then, a solution of 1.0 part of sodium hydroxide in 20 parts of ion-exchanged water was added to the reaction mixture, and the mixture was heated under agitation at 60° C. for 3 hours to effect hydrolysis of the methyl ester.

200 Parts of water was added to the thus-obtained polymer solution, and benzene and methylethyl ketone were distilled off under reduced pressure and the concentration was adjusted by addition of water to obtain a stable emulsion having a resin content of 25 percent.

A heat-treated film product prepared from this emulsion in the same manner as in Example 1 had the mechanical properties as shown below:
100 % Modulus : 8 Kg/cm$^2$
300 % Modulus : 15 Kg/cm$^2$
Tensile strength : 154 Kg/cm$^2$
Elongation : 730 %

EXAMPLE 4

354 Parts of the same polyurethane-urea-polyamine solution as prepared in Example 3 was reacted with 5.6 parts of epichlorohydrin in the same manner as in Example 3, and 7.0 parts of sodium monochloroacetate was added to the reaction mixture and the reaction was carried out at 60° C. for 4 hours. When a small amount of the reaction mixture was sampled and mixed with water and the mixture was shaken, the mixture exhibited a milky white color and it was confirmed that the reaction for rendering the polyurethane-urea-polyamine amphoteric had advanced sufficiently.

200 Parts of water was added to the thus-formed reaction mixture, and the organic solvents used were distilled off under reduced pressure and the concentration was adjusted by addition of water to obtain a stable emulsion having a resin content of 20 percent.

A heat-treated film product prepared from this emulsion in the same manner as in Example 1 had the mechanical properties as shown below:
100 % Modulus : 8 Kg/cm$^2$
300 % Modulus : 17 Kg/cm$^2$
Tensile strength : 161 Kg/cm$^2$
Elongation : 760 %

EXAMPLE 5

A solution of a urethane prepolymer having a terminal isocyanate group content of 6.55 percent was prepared by reacting 100.6 parts of a hydroxyl-terminated polyester glycol (having a hydroxyl value of 55.8) prepared by dehydrating condensation of adipic acid and ethylene glycol, with 33.6 parts of hexamethylene diisocyanate in 57.8 parts of benzene at 80° C. for 5 hours.

A solution of 9.1 parts of diethylene triamine in 192 parts of methylethyl ketone was charged in another flask, and while the temperature of the charge of the flask was maintained at 25° C., 96 parts of the above urethane prepolymer solution was added dropwise to the charge in the flask over a period of 30 minutes. Then, the reaction was carried out at 50° C. for 30 minutes.

Then, 15.7 parts of epibromohydrin was added to the reaction mixture, and the reaction was carried out at 50° C. for 1 hour. Then, 15.6 parts of 1,4-butane sultone was added to the reaction mixture and the reaction was further conducted at 60° C. for 2 hours.

Subsequently, 323 parts of ion-exchanged water was added to the reaction mixture, and the organic solvents used were distilled off under reduced pressure and the concentration was adjusted by addition of water to obtain a homogeneous stable emulsion having a resin content of 25 percent.

A heat-treated film product prepared from this emulsion in the same manner as in Example 1 had the mechanical properties as shown below:
Tensile strength : 221 Kg/cm$^2$
300 % Modulus : 87 Kg/cm$^2$
Elongation : 610 %

EXAMPLE 6

A solution of a urethane prepolymer having a terminal isocyanate group content of 2.28 percent was prepared by reacting 201.4 parts of a hydroxyl-terminated polyester glycol (having a hydroxyl value of 111.4), which had been formed by dehydrating condensation of 1,4-butane diol and adipic acid, with 56.4 parts of xylylene diisocyanate in 110.5 parts of benzene at 80° C. for 4.5 hours.

A solution of 7.0 parts of diethylene triamine in 400 parts of methylethyl ketone was charged in another flask, and while the temperature of the charge of the flask was maintained at 5° to 6° C., 200 parts of the above urethane prepolymer solution was added dropwise to the charge in the flask over a period of 50 minutes. Then, the reaction was carried out at 50° C. for 40 minutes.

Then, 8.8 parts of epichlorohydrin was added to the reaction mixture and the reaction was carried out at 60° C. for 1 hour. Then, 10.8 parts of $\epsilon$-caprolactone was added to the reaction mixture and the reaction was further conducted at 60° C. for 2 hours. Subsequently, 660 parts of water was added to the resulting reaction mixture, and the organic solvents used were distilled off under reduced pressure and the concentration was adjusted by addition of water to obtain an emulsion having a resin content of 20 percent.

A heat-treated film product prepared in the same manner as in Example 1 had mechanical properties as shown below:
Tensile strength : 243 Kg/cm$^2$
300 % Modulus : 108 Kg/cm$^2$
Elongation : 580 %

EXAMPLE 7

A solution of a urethane prepolymer having a terminal isocyanate group content of 2.37 percent was prepared by reacting 198.2 parts of polytetramethylene ether glycol (having a hydroxyl value of 56.6) with 50 parts of diphenylmethane-4,4'-diisocyanate in 106 parts of methylethyl ketone at 70° C. for 2.5 hours.

A solution of 9.7 parts of triethylene tetramine in 400 parts of acetone was charged in another flask, and while the temperature of the charge of the flask was maintained at 10° to 12° C., 200 parts of the above urethane prepolymer solution was added dropwise to the charge in the flask over a period of 1 hour. Then, the reaction was carried out at 50° C. for 30 minutes to obtain a polyurethane-urea-polyamine solution.

Subsequently, 20.9 parts of epibromohydrin was added to this polyurethane-urea-polyamine solution, and the reaction was carried out at 50° C. for 1 hour. Then, 18.6 parts of 1,3-propane sultone was added to the reaction mixture, and the reaction was further conducted at 50° C. for 2 hours under agitation to render the amino groups in the polyurethane-urea-polyamine amphoteric. Then, 560 parts of water was added to the resulting reaction mixture, and methylethyl ketone and acetone were distilled off under reduced pressure and the concentration was adjusted by addition of water to obtain an emulsion having a resin content of 25 percent.

A heat-treated film product prepared in the same manner as in Example 1 had the mechanical properties as shown below:

Tensile strength : 254 Kg/cm²
300 % Modulus : 114 Kg/cm²
Elongation : 640 %

The embodiments of the invention in which an exclusive property or privilege is claimed are defined as follows:

1. A process for preparing an amphoteric thermosetting polyurethane emulsion, which consists essentially of:
   1. reacting, in the liquid phase and in a ketone solvent, at a temperature of from −20° to +70° C., (A) isocyanate-terminated urethane prepolymer prepared by reacting organic polyol having a molecular weight in the range of from 200 to 10,000 with an excess of organic polyisocyanate, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
   2. reacting, in the liquid phase, the reaction product of step 1 with an epihalohydrin, at a temperature of +20° to +70° C., for 0.5 to 5 hours, the amount of said epihalohydrin being in the range of from 0.2 to 1.0 moles per mole of the primary and secondary amino groups of said polyurethane-urea-polyamine,
   3. reacting, in the liquid phase, the reacting product of step 2 with either
      a. a substance selected from the group consisting of 1,3-propane sultone, 1,4-butane sultone, β-propiolactone, ε-caprolactone, δ-valerolactone and sodium monohalogenated carboxylate, at a temperature of +40° to +70° C., for 3 to 7 hours, the amount of said substance being in the range of 0.5 to 2.0 moles per mole of amino groups of the polyurethane-urea-polyamine and sufficient to render amphoteric the amino groups of the reaction product of step 2 so that a stable emulsion is formed when water is added and blended in the product of step 3(a), or
      b. a substance selected from the group consisting of methyl acrylate, ethyl acrylate, methyl methacrylate, ethyl methacrylate, and acrylonitrile, at a temperature of 40° to 70° C., for 3 to 7 hours and then hydrolyzing the reaction product, the amount of said substance (b) being in the range of 0.5 to 2.0 moles per mole of amino groups of the polyurethane-urea-polyamine and being sufficient to render amphoteric the amino group of the reaction product of step 2 so that a stable emulsion can be formed when water is added and blended in the product of step 3(b),
   4. treating the product of step 3 to remove the organic solvent therefrom and adding water thereto and thereby obtaining an aqueous thermosetting polyurethane emulsion as a final product.

2. A process according to claim 1, in which the ratio of (b) the total mole number of amino groups containing active hydrogen atoms in the polyalkylene polyamine, to (a) the total mole number of isocyanate groups in said urethane prepolymer is in the range of $1 < b/a \leq 5$.

3. A process according to claim 1, in which said polyalkylene polyamine has the formula

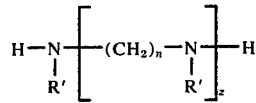

wherein n is an integer larger than one, z is an integer from 2 to 4 and R' is hydrogen, alkyl having one to 4 carbon atoms or hydroxyalkyl having one to 4 carbon atoms.

4. An aqueous amphoteric polyurethane emulsion prepared by the process of claim 1.

5. A polyurethane molded product prepared by forming the emulsion of claim 4 into a molded product and then heat-treating the product to effect cross-linking.

* * * * *